United States Patent
Thompson

(10) Patent No.: US 8,850,314 B2
(45) Date of Patent: Sep. 30, 2014

(54) CONTEXT DRIVEN HELP FUNCTION

(75) Inventor: Michael Thompson, Paris (FR)

(73) Assignee: Business Objects Software Limited, Dublin (IE)

( * ) Notice: Subject to any disclaimer, the term of this patent is extended or adjusted under 35 U.S.C. 154(b) by 725 days.

(21) Appl. No.: 12/542,874

(22) Filed: Aug. 18, 2009

(65) Prior Publication Data

US 2010/0050079 A1 Feb. 25, 2010

(30) Foreign Application Priority Data

Aug. 21, 2008 (EP) .................................. 08290793

(51) Int. Cl.
*G06F 3/00* (2006.01)
*G06F 9/44* (2006.01)

(52) U.S. Cl.
CPC .................................. *G06F 9/4446* (2013.01)
USPC ............................ 715/705; 715/708; 715/714

(58) Field of Classification Search
CPC ............................ G06F 9/4446; G06F 3/04895
USPC .......................................... 715/705, 708, 714
See application file for complete search history.

(56) References Cited

U.S. PATENT DOCUMENTS

| | | | |
|---|---|---|---|
| 5,471,575 A | 11/1995 | Giansante | |
| 7,849,405 B1 * | 12/2010 | Coletta et al. | 715/708 |
| 2002/0095658 A1 * | 7/2002 | Shulman et al. | 717/111 |
| 2002/0147757 A1 | 10/2002 | Day et al. | |
| 2003/0001875 A1 * | 1/2003 | Black et al. | 345/708 |
| 2003/0016238 A1 * | 1/2003 | Sullivan et al. | 345/705 |
| 2003/0144746 A1 * | 7/2003 | Hsiung et al. | 700/28 |
| 2003/0229608 A1 * | 12/2003 | Reynar et al. | 707/1 |
| 2006/0004739 A1 * | 1/2006 | Anthony et al. | 707/4 |
| 2006/0129929 A1 * | 6/2006 | Weber et al. | 715/538 |
| 2007/0074112 A1 | 3/2007 | Knauer | |
| 2007/0143128 A1 * | 6/2007 | Tokarev et al. | 705/1 |
| 2007/0271107 A1 | 11/2007 | Fiedler et al. | |
| 2008/0109723 A1 * | 5/2008 | Burton et al. | 715/708 |

OTHER PUBLICATIONS

Leahy, "Using Excel for Analyzing Survey Questionnaires", Cooperative Extension Publishing, University of Wisconsin-Extension, pp. 1,9.*
European Search Report dated Nov. 26, 2008 for EP Application No. 08290793.2 (EP Publication 2159693 A1 dated Mar. 3, 2010); pp. 26 - 28; EPO, Munich, Germany.

* cited by examiner

*Primary Examiner* — Kieu Vu
*Assistant Examiner* — Aaron Lowenberger

(57) ABSTRACT

Disclosed are methods and systems for generating dynamic context aware help for operations supported by at least one reporting system. The methods and systems relate to receiving a help request for an operation from a client computer including at least one report file, analyzing the at least one report file to generate context data, dynamically generating help data according to the context data and the operation and sending the generated help data to the client computer.

23 Claims, 10 Drawing Sheets

| CITY | SALES REVENUE | QUANTITY SOLD |
|---|---|---|
| NEW YORK | 633,997.7 | 176 |
| HOUSTON  120 | 125  520,332.4 | 130  182 |
| LOS ANGELES | 379,204.5 | 181 |
| SAN FRANCISCO | 318,565.4 | 182 |
| AUSTIN | 252,643.9 | 175 |
| WASHINGTON | 239,830.6 | 177 |
| BOSTON | 208,876.5 | 178 |
| COLORADO SPRINGS | 192,278.8 | 179 |
| DALLAS | 188,791.2 | 178 |
| MIAMI | 171,003.1 | 180 |
| SUM: | $3,105,524 | 1788 |

| | 105 | 110 | 115 |
|---|---|---|---|
| CITY | SALES REVENUE | QUANTITY SOLD |
| NEW YORK | 633,997.7 | 176 |
| HOUSTON  120 | 125  520,332.4 | 130  182 |
| LOS ANGELES | 379,204.5 | 181 |
| SAN FRANCISCO | 318,565.4 | 182 |
| AUSTIN | 252,643.9 | 175 |
| WASHINGTON | 239,830.6 | 177 |
| BOSTON | 208,876.5 | 178 |
| COLORADO SPRINGS | 192,278.8 | 179 |
| DALLAS | 188,791.2 | 178 |
| MIAMI | 171,003.1 | 180 |
| SUM: | $3,105,524 | 1788 |

[measure_expression] Where [boolean_expression]

| | |
|---|---|
| [measure_expression] | Any measure expression |
| [boolean_expression] | Any boolean expression or dimensions or measures |

The formula `Average ([Sales Revenue]) Where ([Country] = "US")` calculates the average sales where the country is "US".
The formula `Average ([Sales Revenue]) Where ([Country] = "US" Or [Country] = "France")` calculates the average sales where the country is "US" or "France".
The formula `[Revenue] Where (Not ([Country] Inlist ("US"; "France")))` calculates the revenue for countries other than US and France.
The variable [High revenue] has the formula `[Revenue] Where [Revenue] > 500000]`. When placed in a block, [High Revenue] displays either the revenue when its value is greater than 500000, or nothing. When placed in a footer at the bottom of the [High Revenue] column, the formula `Average ([High Revenue])` returns the average of all; the revenues greater than 500000.

FIG. 2
(PRIOR ART)

Contextual Examples from [Table_Name] ← 305

The formula Average ([Sales Revenue] Where [Quantity Sold] > "179") would impact only [City] values "Houston, Los Angeles, San Francisco, Miami" and would return 180.23 ←305d  ⌐305a
                                                                                                              ⌐305b
The formula Min ([Sales Revenue]) Where ([City] = "New York" Or [City] = "Boston") compares "New York" or "Boston" from the table and would return 177 ←305e
The formula Sum [Quantity Sold] Where (Not ([City] Inlist ("New York", "Boston"))) calculates the revenue for City values that are not "New York, Boston" and would return 1434  ⌐305c
                                       305f

⎫
⎬ 300
⎭

310 ⎰ Average ([Measure] WHERE ([2$^{nd}$ Measure to compare] > [median value from 2$^{nd}$ Measure to compare] "would impact only" [Dimensional context for [Measure]] "and would return" [calculated output].

| Country | Region | Product | Sales | Units Sold |
|---|---|---|---|---|
| France | North | Widget 1 | $ 1,100 | 100 |
| | North | Thingy 2 | $ 6,900 | 627 |
| | South | Widget 1 | $ 5,900 | 536 |
| | South | Thingy 2 | $ 8,100 | 736 |
| | East | Widget 1 | $ 8,800 | 733 |
| | East | Thingy 2 | $ 2,600 | 236 |
| | West | Widget 1 | $ 3,500 | 350 |
| | West | Thingy 2 | $ 2,500 | 227 |
| UK | North | Widget 1 | $ 7,600 | 691 |
| | North | Thingy 2 | $ 9,100 | 910 |
| | South | Widget 1 | $ 6,500 | 591 |
| | South | Thingy 2 | $ 5,400 | 491 |
| | East | Widget 1 | $ 9,500 | 792 |
| | East | Thingy 2 | $ 1,500 | 136 |
| | West | Widget 1 | $ 2,500 | 250 |
| | West | Thingy 2 | $ 8,200 | 820 |
| USA | North | Widget 1 | $ 2,500 | 250 |
| | North | Thingy 2 | $ 7,600 | 633 |
| | South | Widget 1 | $ 5,500 | 458 |
| | South | Thingy 2 | $ 5,600 | 467 |
| | East | Widget 1 | $ 7,800 | 780 |
| | East | Thingy 2 | $ 9,800 | 891 |
| | West | Widget 1 | $ 4,900 | 490 |
| | West | Thingy 2 | $ 3,900 | 390 |
| SUM | | | $ 137,300 | 12587 |

405 Country, 410 Region, 415 Product, 420 Sales, 425 Units Sold

FIG. 4A

| Country | Region | Sales | Units Sold |
|---|---|---|---|
| France | North | $ 1,100 | 100 |
| | North | $ 6,900 | 627 |
| | South | $ 5,900 | 536 |
| | South | $ 8,100 | 736 |
| | East | $ 8,800 | 733 |
| | East | $ 2,600 | 236 |
| | West | $ 3,500 | 350 |
| | West | $ 2,500 | 227 |
| UK | North | $ 7,600 | 691 |
| | North | $ 9,100 | 910 |
| | South | $ 6,500 | 591 |
| | South | $ 5,400 | 491 |
| | East | $ 9,500 | 792 |
| | East | $ 1,500 | 136 |
| | West | $ 2,500 | 250 |
| | West | $ 8,200 | 820 |
| USA | North | $ 2,500 | 250 |
| | North | $ 7,600 | 633 |
| | South | $ 5,500 | 458 |
| | South | $ 5,600 | 467 |
| | East | $ 7,800 | 780 |
| | East | $ 9,800 | 891 |
| | West | $ 4,900 | 490 |
| | West | $ 3,900 | 390 |
| SUM | | $ 137,300 | 12587 |

Column references: 405 (Country), 410 (Region), 420 (Sales), 425 (Units Sold)

FIG. 4B

Country Revenue

France —405a  $39,400 —420a  3547 —425a

| Region —410 | Sales —420 | Units Sold —425 |
|---|---|---|
| North | 8000 | 727 |
| South | 14000 | 1273 |
| East | 11400 | 970 |
| West | 6000 | 577 |

UK —405b  $50,300 —420b  4681 —425b

| Region —410 | Sales —420 | Units Sold —425 |
|---|---|---|
| North | 16700 | 1601 |
| South | 11900 | 1082 |
| East | 11000 | 928 |
| West | 10700 | 1070 |

USA —405c  $47,600 —420c  4359 —425c

| Region —410 | Sales —420 | Units Sold —425 |
|---|---|---|
| North | 10100 | 883 |
| South | 11100 | 925 |
| East | 17600 | 1671 |
| West | 8800 | 880 |

FIG. 4D

| Aggregate | Character | Date & Time | Misc | Numeric | Operators |
|---|---|---|---|---|---|
| Average | ASCII | CurrentDate | BlockName | Abs | And |
| Count | Concatenate | DayNumberofMonth | ElseIf | Exp | ForAll |
| Percentile | Fill | LastDayofWeek | IF | Factorial | InList |
| RunningSum | Length | MonthsBetween | ForceMerge | Log | Not |
| StdDev | Substr | RelativeDate | ReportName | Power | Section |
| Variance | URL encode | ToDate | RowIndex | Tan | Self |
| ... | ... | ... | ... | ... | ... |

FIG. 6

CONTEXT DRIVEN HELP FUNCTION

This application claims the benefit of the filing date of EP App. Ser. No. 08290793.2, filed Aug. 21, 2008, entitled "Context Driven Help Function", the entire disclosure of which is hereby incorporated by reference into the present application.

FIELD OF THE INVENTION

The invention is directed generally to data and/or information retrieval systems and corresponding reporting mechanisms, and in particular to a computer-implemented method, computer system, and computer program product for generating dynamic context aware help data (e.g. help functions, help functionality) for operations supported by at least one reporting system.

BACKGROUND OF THE INVENTION

Both online (e.g. web-based) and offline tools, systems, or mechanisms used to perform reporting and/or analysis (hereinafter referred to as reporting systems) such as Excel, Web Intelligence (hereinafter referred to as WebI), Crystal Reports, and/or Lotus may support several operations. These operations may comprise query statements, functions, formulas, and formula functions. The operations may be used to analyze or manipulate documents such as reports, report documents and/or files (hereinafter referred to as report files) provided and/or generated by the reporting systems. Hence, an aspect of using reporting systems may be specifying and/or creating operations in order to analyze and/or manipulate at least one report file e.g. by calculating quantitative and/or qualitative information.

However, when a user invokes or requests help data, functions or functionality during the process of performing operations, current reporting systems merely retrieve a static document (e.g. a HTML page or a XHTML page) comprising a predefined generic example which may not be useful, or may even be meaningless in the context of the operations being performed by a user, i.e. a user's context such as a context of a report file for which help has been requested. In other words, the current 'help' functionality for reporting systems such as WebI, Crystal Reports or Excel does not include effective contextual help.

Hence, there may be a need to provide user-friendly, dynamically generated help data for user operations. It may also be desirable for the help data to be context aware and/or context sensitive, i.e. help data which may be contextual or context driven regarding to a user context (where a user context may be one or more report files the user wants to analyze and/or manipulate using operations). In contrast to static predefined help data, dynamic context-aware help data may provide a user with actual expressions (e.g. one or more exemplary context aware or context sensitive operations) which can be used in a report file. Dynamic, context-aware help data may additionally provide a useful result (when computed from the report file) when the context sensitive exemplary operations comprised in the help data are applied to the report file.

SUMMARY OF THE INVENTION

Disclosed are computer implemented methods and systems for generating dynamic context aware help data (e.g. help functions, help functionality) for operations supported by at least one reporting system. The methods and systems include receiving a help request for an operation from a client computer comprising at least one report file, generating a context data by analyzing the at least one report file, generating help data dynamically according to the context data and the operation and sending the help data to the client computer. The operation may be used to analyze the at least one report file. The help functions include one or more examples and a template for the operation based on the context. The help data is generated by matching the context data with functions and/or operators used in operations by other users in a context similar to the context data of the report file.

In an embodiment, generating dynamic context aware help data such as help functions and/or help functionality for operations supported by at least one reporting system includes receiving a request for a help function for an operation from a user at a user interface (UI), generating the help function dynamically by taking into account a context of the report file and displaying the help function in the UI to the user.

Based on the request for the help data, the request for help functionality or the invocation of a help function (e.g. invocation of a help function by a user while performing an operation supported by a reporting system, in order to analyze and/or manipulate at least one report file generated by the reporting system), an (online) help system may dynamically generate and subsequently display context aware or context sensitive help data to the user. Context aware or context sensitive may refer to the context of at least one report file that the user wishes to analyze and/or manipulate using one or more operations supported by the reporting system.

When dynamically generating and subsequently displaying context aware help data to the user, an underlying (e.g., online) help system takes into consideration a context of at least one report file on which an operation is to be performed. The dynamic context aware help data provides one or more examples and/or a template for the operation. The one or more examples may provide the user with instances of the operation including exemplary objects, content from the report file and/or a corresponding result calculated from the report file and based on the objects as well as the content. The one or more examples may also include a representative subset of possible context which may take into consideration one or more objects (e.g. one or more dimensions and/or one or more measures), corresponding content, data, and/or relationships between the objects (e.g. semantics of the report file). The example(s) may combine the context with one or more operators, functions, and/or formulas in the operation. The template may provide the user with a context sensitive suggestion as to how the operation may be used in the context of the report file by taking into consideration one or more objects and/or related content (e.g. values for the objects) of the report file.

In other words, dynamic contextual help data for an operation in a user's context (in particular, the context of a report file) leverages object knowledge from the context of a report file and provides a user with context specific examples and/or a contextual template. The examples may provide actual expressions (e.g. instances of the operation including objects and/or content from the report file) that could be used in an analysis of the report file, the examples may also provide actual results for the expressions (calculated from the report file when applying the expressions).

Accordingly, rather than merely providing a generic example in help data such as:

"The formula Average ([Sales Revenue]) Where ([Country] ="US") calculates the average sales where the country is 'US'".

Context aware help data may provide the following example:

"The formula Average ([Sales Revenue]) Where ([Quantity Sold]>"179") would impact only [City] values "Houston, Los Angeles, San Francisco, Miami" and would return 180.23".

The user may even copy/paste the examples into his/her analysis of the report file. In this way, usability of help data for operations is improved. Furthermore, the template could enable building a plurality of context sensitive suggestions for the operation. In this way, man-machine interaction is improved, particularly when analyzing report files. Furthermore, the user is relieved of the mental task of conceiving how an operation can be used in the context of his/her report file. The user would still have to perform the mental task if he were provided with predefined, static help data. Consequently, the user is aware of how to use a particular operation in the context of his/her report file due to use of the dynamic, context aware help data.

Furthermore, users may benefit from contextual-driven or context aware help data in that the context aware help data may dramatically improve understanding of the operations, which may be used to analyze the report file. The help system displays to the user one or more operations. In particular, the help system displays several different instances of that operation, applied to different aspects of the user's context. This learning by example will help the user learn much more quickly. Additionally, users will often be able to copy and paste the function directly into their report context with a guaranteed applicability. This eliminates syntax errors that are common for almost any (formula) language interface provided for such kinds of operations. Through the proposed list of different, applicable uses of one or more operations included in the context aware help data, users may gain a wider view of the range and type of questions the one or more operations help to answer. In this way, the user's ability to analyze the report file is improved.

According to another embodiment, the context of the report file may include information on one or more objects, corresponding content of the report file, and/or semantics of the report file.

According to yet another embodiment, the computer implemented method includes dynamically generating a first drop down list for the help data comprising one or more objects from the report file usable within the template and/or dynamically generating a second drop down list for the help data including one or more operators for the operation that is usable within the template.

In other words, the dynamic context aware help data may provide the user with a UI that may enable the user to interactively choose an object context from a drop down list or menu. The user may launch the selected object.

Furthermore, inside the displayed dynamic context aware help data, the UI may enable the user to navigate the template by a drop down list or menu wherein (substantially) each changeable option is highlighted. The changeable options may include different operators. Operators may be functions and/or formulas usable within the operation for which the help data is requested.

According to yet another embodiment, the computer-implemented method may include receiving a selected focus for the report file from the client computer and generating the one or more examples dynamically according to the selected focus. In other words, a user may specify or determine a selected focus (e.g. at least one object of the report file such as a column of a table), which may then be used to generate a more exhaustive list of examples (i.e. concrete instances of the operation) in the context of the report file for use in the help data.

According to yet another embodiment, the computer implemented method may include receiving and storing one or more operations performed in the context data, the one or more operations are performed before receiving the help request and dynamically generating the help data based on the context data and on the performed operations.

In particular, the dynamic, context aware help data may be implemented in a dHTML (dynamic HTML) application. The dHTML application may be provided with information regarding the operations and the one or more contexts (possibly of different report files) that have been invoked and/or used by one or more users. Operations that users have used around one or more (specific) objects of at least one report file may then be used to generate help data, thereby enabling the computation and generation of help data providing exemplary calculations derived from previous calculations performed by other users with respect to the objects. Hence, the context sensitive help data evolve and may be enabled to provide improved and more useful examples and/or templates for an operation that are usable based on the given context and/or contexts of the report file.

According to yet another embodiment, the template may include a description of an output written in natural language.

In yet another embodiment, a computer-implemented method for requesting dynamic context aware help data for operations supported by at least one reporting system may include sending a help request for an operation to a server computer, the operation can be used to analyze at least one report file and receiving help data for the operation. The help data is dynamically generated according to a context data and the operation, the context data being generated by analyzing the at least one report file. The help data includes one or more examples and at least one template for the operation based on the context data.

In yet another embodiment, a computer system for generating dynamic context aware help data (e.g. help functions, help functionality) for operations supported by at least one reporting system is provided, the system may include a help service operable to receive a help request for an operation from a client comprising at least one report file, wherein the operation can be used to analyze the at least one report file, analyze the at least one report file to generate context data, dynamically generate help data according to the context data and the operation, wherein the help data comprise one or more examples and at least one template for the operation based on the context data, respectively; and send the help data to the client.

In yet another embodiment, a computer system for requesting dynamic context aware help data for operations supported by at least one reporting system is provided, the system may include a client comprising a UI operable to send a help request for an operation to a server, wherein the operation can be used to analyze at least one report file, receive help data for the operation, wherein the help data is dynamically generated according to a context data and the operation, the context data being generated by analyzing the at least one report file, and wherein the help data comprise one or more examples and at least one template for the operation based on the context data, respectively.

According to yet another aspect, the systems are further operable to perform operations according to any one of the above methods.

The subject matter described in this specification can be implemented as a method or as a system or using computer program products, tangibly embodied in information carriers, such as a CD-ROM, a DVD-ROM, a semiconductor memory, and a hard disk. Such computer program products may cause a data processing apparatus to conduct one or more operations described in this specification.

In addition, the subject matter described in this specification can also be implemented as a system including a processing unit and a memory coupled to the processor. The memory may comprise one or more programs that cause the processing unit to perform one or more of the method acts described in this specification.

BRIEF DESCRIPTION OF THE DRAWINGS

A better understanding of embodiments of the invention are illustrated by examples and not by way of limitation, the embodiments can be obtained from the following detailed description in conjunction with the following drawings, in which:

FIG. 1 illustrates an exemplary report file.

FIG. 2 illustrates an exemplary (prior art) help data.

FIG. 3 illustrates an exemplary dynamic context aware help data.

FIG. 4A illustrates an exemplary report file.

FIG. 4B illustrates an exemplary scenario of removing a column.

FIG. 4D illustrates an exemplary contextual report wherein the "Country" column is dragged from the report file.

FIG. 6 illustrates an exemplary table comprising functions and/or formula from different categories.

DETAILED DESCRIPTION

Figure 4C:
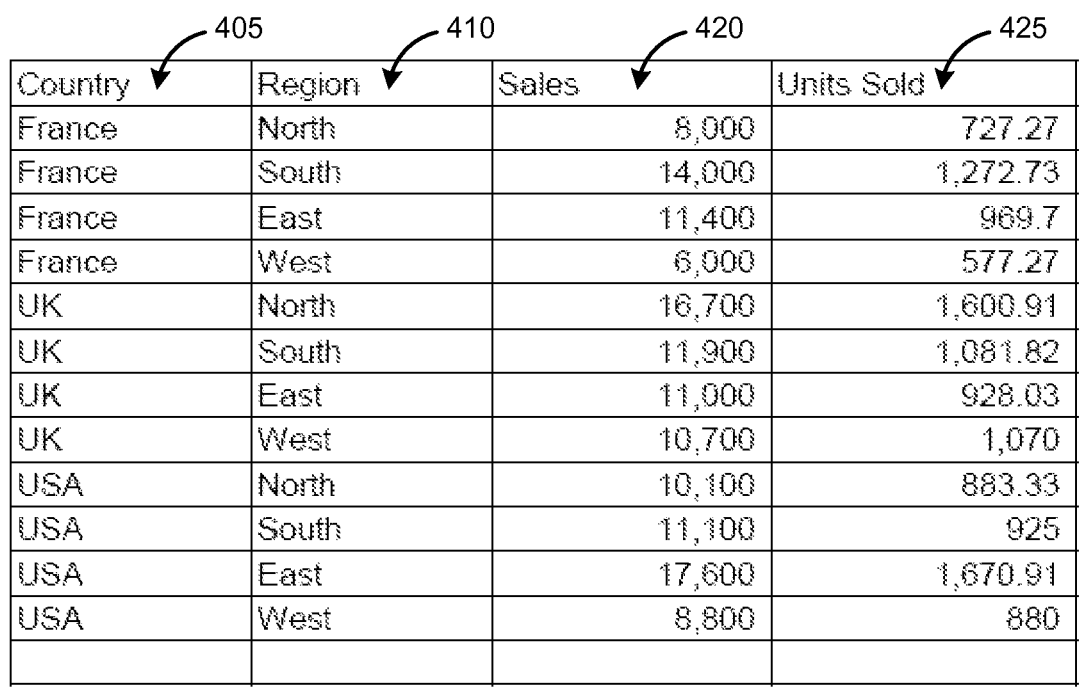
FIG. 4C illustrates an exemplary contextual report wherein the "Product" column is deleted from the report file.

In the following, a detailed description of examples will be given with reference to the drawings. It should be understood that various modifications to the examples may be made. In particular, elements of one example may be combined and used in other examples to form new examples.

The following technical terms are used throughout the description. The terms may refer to but are not limited to the subsequently provided explanations.

Reporting System—General purpose reporting and/or database querying systems may be tools or (software) applications that support users and/or analysts in querying and/or accessing one or more data sources. The data sources may include services, applications, and/or semi-structured (e.g. XML-based) and/or structured (e.g. SQL-based) databases. Examples of reporting tools may include but not limited to Excel, Lotus 123, Web Intelligence (abbreviated WebI), Crystal Reports. The systems may assist users and/or analysts to design and/or generate reports from a wide range of data sources. Furthermore, reporting systems may provide self-service access to data and/or information analysis retrieved from one or more possibly distributed data sources, e.g., in order to make effective decisions. In other words, a reporting system may be a substantially powerful online and/or offline ad hoc query and reporting tool for generating, analyzing and/or manipulating report files generated by the reporting system.

For example, WebI provides an intuitive interface that allows analysts and non-technical information consumers and/or users to ask spontaneous and iterative questions of their data with commonly used terms. For example, a user may easily compare data on the performance of suppliers this year with data from last year, combine this with his forecast from his spreadsheet, access a trusted data source for more detailed information, quickly identify trends, and determine areas within a supply chain that may be optimized to ensure maximum profitability—all within a single session.

Report file—A report file may include a representation of data and/or information (e.g. in terms of a table, a chart, a map, a multi-dimensional table and/or portions therefore) which may provide a display or visualization of quantitative (and/or qualitative) information and/or data. The report file may be specified using one or more objects, wherein each of the objects may comprise content in terms of data and/or information (e.g. one or more values of the objects). An object of the report file may for example comprise one or more columns and/or rows in a table, one or more axes and/or data within a chart, one or more regions in a map, dimensions in a multi-dimensional table and/or data in a time series. Furthermore, a user may select or specify one or more parameters for a report file, which focuses on one or more objects of the report file that the user is interested in. Furthermore, the report file may specify one or more relationships (comprising rows in a table or plotted points in a chart) between the objects. The report file may refer to a document or set of documents generated and/or computed by the reporting system (e.g. upon one or more user requests and/or queries) and displayed to a user in a UI. An example of the report file may be a table comprising columns and rows, wherein the columns may define one or more objects comprising dimensions and/or measures, the rows may define a relationship between the objects, and the entries in the table may define content of the objects and their relationship(s). Further examples of report files may be charts, maps, and/or portions thereof.

Context data or context (of a user/report file)—A user's context may refer to the context of at least one report file, wherein the context of a report file may include objects such as one or more data sets, corresponding content (data) of the objects of the report file, (semantic) relationships between the objects, metadata describing or specifying the objects, object relationships, content, and/or semantics of the report file.

Operations—Queries against reporting systems may be formulated by means of operations including query statements, functions, formulas, and/or formula functions. Examples of operations that can be used to analyze and/or manipulate report files may be query statements (e.g. SQL-statements, XQuery statements), functions (e.g. aggregation functions such as AVG, MIN, MAX, SUM), and/or formulas supported by an underlying reporting system. The operations may be formulated in a query language (e.g. SQL, XQuery) or an analysis tool such as OLAP, using one or more operators. Operations may comprise aggregations (e.g. SUM, AVG, MIN, MAX, COUNT), projections, joins, mathematical functions such as computing a square root, selections, sorting functions, etc.

Help data comprising help functions and/or functionality—Help data including help functions and/or help functionality may provide a user and/or analyst with help and/or support in formulating operations against one or more report files in a reporting system. For example, help data may describe and explain the syntactically correct manner to formulate, and/or specify an operation. Furthermore, the help data may explain the semantics of an operation for which the corresponding help functionality is requested.

Dimension—A dimension may be a line in a real space or in an abstract space. An example of a real space dimension may be a pair of opposing cardinal points on a compass, e.g., North and South, North-northwest and South-southeast. Another example of a real dimension may be time. An example of an abstract space dimension may be a list of stores. The dimension with regard to the list of stores may be considered abstract because the list can be ordered alphabetically by name, by store number, by distance from head office, etc. Examples of dimensions may comprise region, store, year, customer, employee, product line, and the like.

Measure—A measure may be a quantity as ascertained by comparison with a standard, denoted in some unit, e.g., units sold, dollars. A measure, such as revenue, may be displayed or visualized for a dimension (e.g. dimension "Year"), which may be in effect the aggregation of all revenue for all years. Corresponding measures may also be displayed for each of the values within a dimension. Region of focus may be either set by default or definable by a user event. The user event may include a user clicking on an area of a table, chart, map, cube or portion, which may display or visualize quantitative information. The user may select one or more charts, maps, columns or rows in a table, axes or data within a chart, data in a time series, or regions in a map. Alternatively, the user event may allow the user to specify a parameter to a report (document). The region of focus may be an area of the report that the user wishes to explore.

Before describing one or more examples with references to the figures, an exemplary application and/or implementation is described with respect to an assembly line. According to the exemplary application, a user (e.g. a foreman) may receive, from a reporting system corresponding to an assembly line "A", a biweekly report file describing productivity for assembly line "A" during each day of the last two weeks. The report file shows assembly line productive output time over those two weeks, the assembly line "A" has dropped from an average 87% effective operating time the two weeks before to 79% in the most recent two weeks. The report file may comprise a number of visualizations. The visualization of the report file may be displayed to the user in a UI of the reporting system and may include at least one detailed table data on the line's operations, where the table data includes one or more events, with each event's duration, ordered chronologically. Event types may comprise one or more different objects. For example, the following measure objects or measures, wherein the measures may be given in terms of minutes:

TABLE 1

| Object Type | Object Name |
|---|---|
| Measure | Scheduled maintenance |
| Measure | unscheduled maintenance |
| Measure | assist time |
| Measure | standby time |
| Measure | production qualification time |
| Measure | process engineering time |
| Measure | productive output time |

Furthermore, the report file may include one or more dimension objects or dimensions. The dimensions for each event may have a shift number, a user name, an operator name and comments from an operator's log. Event dimensions may further have additional objects (comprising measures and/or dimensions). In one example, a report file displayed to the user for an assembly line may include a table having at least twelve columns corresponding to at least twelve different objects.

Having received the biweekly report file describing productivity for a respective (assembly) line for each day during the last two weeks, the user may use standard analysis tools supported by the underlying reporting system. The analysis tools may include features such as sorting, filtering and/or drilling of data and/or objects of the report file. The analysis tools may be used to obtain further details about the report file in order to understand some aspects of the corresponding assembly line's productivity.

In one exemplary aspect, the user may have additional questions about the report file. For example, the user may also want to explore, e.g. by using different operations (e.g. query statements, functions, formulas, and/or formula functions), ways to understand the evolution of the productive output of the assembly line "A" described in the report file over the two weeks shown in the report file.

To understand what kinds of better operations the user may use to analyze, explore, and/or manipulate the report file for the corresponding assembly line "A", the user may invoke a help function. The help functionality may be invoked by a user request for context sensitive or context aware help data through a UI of the underlying reporting system. The help data may include at least one context aware help function. When invoking help functionality of the reporting system, a help interface (e.g. a help UI or GUI) may be displayed to the user.

In one embodiment, the help interface may propose to the user a ranked list of substantially relevant operations other users have used in a similar context. The context of the report file for the assembly line may be specified by the objects (i.e. the different columns relating to the above identified measures and dimensions), content data relating to the objects (i.e. entries or values in the columns or rows of the table), and/or rows. The context of the report file may define relations between the values of a row relating to a set of objects, and/or relationships between the objects. Furthermore, the operations proposed to the user by the help interface may be prioritized by a correlation with the user's context with respect to the report file in question (i.e. the report file for which help functionality is requested).

In one exemplary aspect, an algorithm for prioritizing operations suggested by the reporting system upon requesting help functionality in the context of a report file may include computations based on:
 (a) a user's selected focus (e.g. dimensions associated with a selected column, row, cell (value)),
 (b) in any of a table, common objects used in the report compared to operations indexed in an indexed database of reports, where the object operations are stored in the corresponding reporting system, and
 (c) a frequency and recent-use of the operations in other reports generated by the reporting system possibly in a similar context.

In another exemplary aspect, a context of the report file for the corresponding assembly line is relatively large (e.g., at least twelve columns specified by at least twelve different objects). Due to the large and possibly complex context, the (online) help functionality invoked by the user for the report file may only generate operations that the other users have used (possibly in a similar context). In narrower contexts (e.g. in case a report file comprises fewer objects), the help functionality would also generate operations that are built dynamically according to the user's context (i.e. the context of the report file currently analyzed by the user).

In one example, a help functionality including context aware help data for the report file of the corresponding assembly line may include a number of operations involving various dimensions, functions and operators such as:

=Count([Unscheduled Maintenance]where ([Shift Number]="1"))

=Sum([Unscheduled Maintenance] where ([Operator Name]=[choose name from list])

=RunningSum([Unscheduled Maintenance]).

From the displayed context aware help data, the user may note that the second operation enables him to select operators by simply clicking on the list. This functionality may be enabled by the list of values attached to the dimension "Operator Name".

In yet another exemplary aspect, the user may use the context aware help data (e.g. exemplary operations) in order to analyze and/or manipulate the report file. For example, from the displayed context aware help data, the user may determine most of the questions that other users have been asking (which could be implied from the operations the other users have been using). For example, the user may recall that a machine maintenance contractor is new, and that the machine maintenance contractor is probably being judged by various line managers and/or foremen on his ability to prevent unscheduled maintenance downtime. To make sure that the user is focused on what his management deems most important, the user may decide to consider the operations used around the unscheduled maintenance dimension. Due to this consideration, the user may add three of the operations dealing with Unscheduled Maintenance to his report. The user may add the selected operations from the help data through simple clicks. Because the operations do not need to be typed by hand, and because the operations are generated automatically from existing report files by the context aware help system by using similar contexts, errors are avoided and the user may perform his tasks more easily and more efficiently. Furthermore, the user is relieved from the mental task of formulating possibly complex operations against his report file for analysis purposes.

In a further exemplary aspect, after having invoked context aware help functionality in the context of a report file, the user may specify additional context to the received help data e.g. by specifying a selected focus. For example, the user may click the column containing the measure "Productive Output Time" in the report file and the corresponding invoked help functionality may interpret this selection as a further context for the report file from which context aware help data is generated and displayed to the user. In other words, the help functionality may take into account the selected focus for the report file (e.g. the column containing the measure "Productive Output Time"). Thus, because the user-selected focus provides a more concentrated context for the algorithm, the operations in the context aware help data displayed to the user may be more useful and effective. The operations may include a recalculated prioritization and exemplary operations that other users have used in that same and/or a similar context.

In case the user specifies a selection context after having received context aware help data for a report file, then because of the specificity of the new context (i.e. the selected focus), additional operations are automatically generated from the context (i.e. the report file and the selected focus) and incorporated into the help data to complement those which were already proposed in the context of the report file without the selected focus. The operations may be generated for a set of functions and operators that complement those proposed based on usage of other users.

In other words, the ability to propose indexed operations from other content is diminished when the context is more unique there are simply fewer pre-existing formulas to propose. However, the narrower context still enables the semantics of the report to be combined with specific functions and operators for different operations usable in the context of the report file.

In a further exemplary aspect, the user may use automatically generated operations provided with the context aware help data in the context of the report file and/or a context of a selected focus for the report file. Thus, the operations included in the context aware help data are not manually generated. Instead, the operations are produced automatically by the help system through the analysis and/or exploration of the context of the report file and/or the selected focus.

In one example, the user analyzing the biweekly report file for the assembly line may be interested in the following operation provided with the context aware help data for the report file:

=RunningAverage([Productive Output Time]Where ([Operator Name]=[choose name from list]).

According to the example, the user may initially want to use RunningSum instead of RunningAverage in the above operation so that he can see how the Productive Output Time evolves over the course of different shifts for the assembly line "A" reported in the report file. Furthermore, for this purpose, the user may click on the RunningAverage operator of the above example operation, included in the context aware help data automatically generated by the help system for the report file and the system will subsequently display to the user a list of other "Running . . . " operators or functions (e.g. RunningProduct, RunningMin, RunningMax, RunningSum, etc.) the user may use within the above example operation. In one example, the user may choose RunningSum.

Continuing with the example, the user may want to modify the retrieved context aware help data to invoke an operation to compare three different machine operators he has on his assembly line A. For this purpose, the user may click on the displayed exemplary operation, and in particular, on the component "choose name from list". In response to the user input (e.g. the mouse click), the help system displays a list of machine operators. The list may be limited by the user's security restrictions. The user may choose one out of the three names from his team, may add the operation to an empty column in the report file and then may repeat for the other two operators.

As shown with respect to the above example, a user (e.g. a foreman), interested in a product or assembly line in an automobile industry, may use the context aware help functionality to formulate complex queries against a biweekly report file on an assembly line the user is responsible for. Due to the help system automatically generating context aware help data for the analysis of a report file generated by a reporting system, the user is able to answer many new questions about content and/or data comprised in the report file by adding numerous operations. The operations are precise in their semantics, relevant, easily extensible, and modifiable. Consequently, using context aware help functionality in the manner described above, facilitates inspection and control of assembly lines, makes the process of assembly more efficient and relieves the user from the mental task of manually inspecting the process. In this way, productivity of the assembly may be increased and may be made more secure and reliable.

FIG. 1 illustrates an exemplary report file 100. The report file 100 includes three objects 105, 110, 115 each having a plurality of data entries, e.g. 120, 125, 130 that are collectively referred to as the content of the report file 100. The object "City" 105 relates to a dimension, whereas the object "Sales revenue" 110 and "Quantity sold" 115 relate to measures. In one example, the objects 105, 110 and 115 and their related content (e.g. 120, 125, 130), and/or relationships between the objects 105, 110 and 115 (which may define a semantics of the report file) may be referred to as a context of the report file 100.

In particular, the report file 100 shows a sales report showing regional, state and city sales results for a given time period.

In one embodiment, reporting systems such as Web Intelligence (abbreviated WebI) are used to create and/or formulate operations against a report file 100.

FIG. 2 illustrates an exemplary help data 200 for an operation comprising the WHERE operator as known in the art. In this example, help data consists of static data (e.g. an HTML or XHTML page). The provided help data 200 is predefined and meaningless with respect to the user's context, i.e. the context of the report file 100. Hence, the help data 200 may not be very helpful or may even be unhelpful for the user.

FIG. 3 illustrates an exemplary dynamic context aware help data 300 for an operation that comprises the WHERE operator in the context of the report file 100 of FIG. 1. Accordingly, the dynamic context aware help data 300 uses or 'leverages' object knowledge that it knows about in the context of the report file 100 and provides the user with one or more examples 305 and a template 310 in the context of the report file 100. The examples 305 and the template 310 are contextual (i.e. context driven) with respect to the report file 100.

For example, 305 includes a representative subset 305a, 305b and 305c of possible context and various operators usable in the operation, comprising the WHERE operator in the context of the report file 100. The first context aware example 305a explains what happens when using the aggregation function, AVG (average) operator. According to the example 305a, a value of the object "Sales Revenue" 110 is projected on to a value of the object "Quantity Sold" 115 when the value of the object "Quantity Sold" 115 is larger than 179. The corresponding result 305d, which would be calculated from the report file 100 when applying this operation, is also depicted. Similarly, context aware examples 305b and 305c show the use of different aggregation functions (i.e. operators) such as MIN and SUM in the context of the report file 100 and corresponding results 305e and 305f.

It should be understood that a plurality of different operations including a plurality of different operators may be referenced in context aware help data provided that they are supported by the underlying reporting system. Accordingly, in one embodiment, the help system requires one or more of the following user inputs in order to make a decision about which one or more exemplary operations are provided in the context aware help data:

1. The user may need to invoke help around a given operation including a function or operator by typing in that desired function/operator or selecting it from a list by the user. Then, the system may propose a template and possible corresponding operations and/or contextually related dimensions inside that operation.
2. The help system's UI may propose a high level suggested list of operations based on various automatically extracted inputs. For example, if there is a time dimension in a report file, the help system may propose operations for manipulating time. If a report file comprises text strings in the columns/rows, the help system may invoke character-related operations. Furthermore, the UI may guide a user towards an increasingly precise definition of the desired context.
3. If a large body of documents created across one or more system's users gets parsed to extract contexts (dimensional) and operations used in those contexts, then the help system may use a user's immediate context (e.g. the context of a report file the user is working on) to match with functions/operators used in operations that other users have applied in similar contexts. This would have the benefit of not requiring the user to make a context precise, but would simply offer the user a list of possible operations (with relevant functions/operators) applicable to the report file.

In one exemplary embodiment, the above input possibilities are not mutually exclusive. The first option may be easy to realize, since a user specifies his requirements but may likely result in errors since the user him/herself is triggering the specific operations required.

The user may even copy and paste the exemplary operations 305a, 305b and 305c for use in his analysis and/or manipulation of the report file 100. This dramatically improves the usability of the dynamic context aware help data 300 for different operations.

In one example, the dynamic context aware help data 300 may further include a template 310 for the requested or invoked help on operations comprising a projection using the WHERE operator. The template 310 for the WHERE operation could enable the dynamic construction of a plurality of contextually sensitive suggestions. Using the template 310 to formulate an analysis and/or a query against the report file 100, a user may click on any automatically generated objects (e.g. dimensions or measures) exposed in the template to adjust their values. For example, the user would be able to click on any text in square brackets in the template 310 to formulate a query. In one exemplary aspect, the user may change the Revenue measure to any other measure from related semantics of the report file 100 such as Units Sold, Margin, etc. In another exemplary aspect, the user may click on Average and is then provided with a help list comprising a number of semantically related choices for functions (e.g. Sum, Percentage, Max, Min). A corresponding template output is then dependent on the choices of the user made for the expressions in brackets of the template 310.

In one example, the dynamic context aware help data 300 including one or more contextual examples 305 and/or a template for the operation (e.g. comprising WHERE) for which help is requested by a user in the context of a report file 100 is displayed and/or visualized to the user in the UI (or a GUI).

In another example, a context aware help system may even provide the UI that enables users to interactively choose an object context (e.g. for objects 105, 110 and 115 of the report file 100 shown in FIG. 1) from drop down lists or menus in (possibly) online help data. The user could subsequently launch the object and accompanying context.

In yet another example, an online help system for generating dynamic context aware help data (e.g. dynamic context aware help data 300) becomes more like a real (simple) dHTML (dynamic HTML) application. Rather than simply taking events which appear when the user interacts with an open (HTML or XHTML) page of the help system (e.g. comprising context aware help data), such a dynamic application may be aware of operations and a corresponding context in which the operations have been invoked and used. Implementing a help system for generating dynamic, context aware help data (e.g. dynamic context aware help data 300) similar to dHTML, the system could also start to keep track of operations that one or more users may use in at least one context of at least one report file. In this way, the online help system may enable the evolution of improved, dynamic, context aware help data. This help data may provide users with information on operations that other users who have calculated something in a given context of a report file have used. This help data may be introduced in the following way "Others who have tried to calculate something with this context, have used these calculations . . . " In this way, context aware help data becomes truly dynamic and enables the suggestion of the (substantially) best operations to use based on a given context of a report file.

FIG. 4A illustrates an exemplary report file 400 comprising a plurality of objects 405, 410, 415, 420 and 425 (the columns of the report file 400) and corresponding content (i.e. values for the objects 405, 410, 415, 420 and 425). The objects 405, 410, 415, 420 and 425, corresponding content, and/or semantics of the report file 400 may relate to the context of the report file 400. The semantics of the report file 400 may include relationships between the objects 405, 410, 415, 420 and 425 (e.g. how content of different objects 405, 410, 415, 420 and 425 can or cannot fit or be used together in an operation). The report file 400 shows how multiple products (Widget 1, Thingy 2) of "Product" 415 were sold across different regions listed in region 410 in each of three countries France, USA, UK.

In order to generate dynamic context aware help data 300 for a report file 400, the underlying reporting system (e.g. Excel, Lotus 123, WebI, Crystal Reports) should consider the semantics of how the content of different objects 405, 410, 415, 420 and 425 (the columns of the report file 400) can or cannot fit or be used together in an operation. For example, Excel and Lotus do not consider the semantics, while WebI is aware of the semantics.

FIG. 4B illustrates an exemplary scenario of removing a column. A user can remove the "Product" object 415 from the report file 400 by deleting the corresponding column from the report file 400 using a reporting system that is not aware of the semantics of the report file 400. As shown in FIG. 4B, since the underlying reporting system is not aware of the semantics of the report file 400, the "Sales" object 420 is not able to determine how to re-compute or re-calculate its corresponding values based on a new context of the report file 400 wherein the "Product" object 415 and its corresponding content are no longer available. Hence, the SUM totals stay correct, but the report file 400 loses context for what has been sold in corresponding regions. However, when deleting or removing the "Region" object 410 from the report file 400 each of the corresponding sales values should be aggregated for each of the countries.

In contrast, using a reporting system such as WebI, which is aware of the semantics of the report file 400 (e.g. semantic awareness defined in the universe and enabled by an information engine comprised in the reporting system), the report file 400 is able to roll up (or aggregate) sales values for each of the regions in each country, when the "Product" object 415 is removed from the report file 400.

FIG. 4C illustrates an exemplary contextual report wherein the "Product" column is deleted from the report file. As shown in FIG. 4A, each region value (i.e. north, south, east and west) of the "Region" object 415 has two corresponding sales values of the "Sales" object, one each for two different product values of the "Product" object 415 (i.e. Widget1, Thingy2). Removing the "Product" object 415 from the report file 400, it is semantically clear that each of the different region values of the "Region" object 410, with corresponding country values, should aggregate the sales values for the corresponding regions. As shown in FIG. 4C, these semantics are automatically provided by the semantic aware reporting system. In fact, most users of the reporting system may not encounter a workflow for defining the semantics to report files, rather the reporting system may do this automatically and may just know or be aware of how to handle the semantics of report files. Accordingly, after the "Product" object 415 and its corresponding content in the respective column is removed or deleted from the report file 400 by a user, the underlying semantic aware reporting system automatically aggregates the sales values for each region in each country, respectively. Furthermore, if the user would additionally remove the "Region" object 410 and its content in the corresponding column from the report file 400, the reporting system would automatically aggregate the sales values to each corresponding country value. In other words, the reporting system would automatically perform (substantially) the same aggregation again on the remaining content in the new context of the report file 400 which is generated through the removed "Product" object 415 or objects 415, 410.

FIG. 4D illustrates an exemplary contextual report wherein the "Country" column is dragged from the report file shown in FIG. 4A. In one embodiment, the semantic aware reporting system, a user can also drop one or more objects 405, 410, 415, 420 and 425 from the report file 400. For example, a user may drag the "Country" object 405 in order to become a header for the report file 400. As shown for this example, each country value 405a, 405b and 405c of the object "Country" 405 automatically becomes a separate section in the report file. Furthermore, the user may copy-drag for each country value 405a, 405b and 405c the corresponding values of the object "Sales" 420 and the object "Units Sold" 425 into the report file 400. The reporting system will then automatically calculate the corresponding sums 420a, 425a, 420b, 425b, 420c, 425c in order to display totals for each country regarding the sales and units sold.

Accordingly, if the user further drags the "Sales" object 420 to the upper part of the report file 400, a context is defined in the underlying semantic aware reporting system that automatically aggregates the corresponding values for the entire report file 400 such that a grand total sales figure will be automatically calculated and displayed. Hence, the semantic aware reporting system may (automatically) re-calculate all measures according to a context of the report file 400 in which the user places the objects 405, 410, 415, 420, 425 using a drag-and-drop functionality. Consequently, if a user further deletes the "Country" object 405 from the report file 400, the semantic aware reporting system will re-calculate the corresponding regional revenue values of the "Region" object 410, which are automatically aggregated by the reporting system for each of the country values 405a, 405b and 405c so that, for example, north sales revenue is automatically aggregated for each country 405a, 405b and 405c.

As shown with reference to FIGS. 4A to 4D, a context of a report file 400 may comprise one or more objects 405, 410, 415, 420, 425, their corresponding content (i.e. values in the columns of each of the objects 405, 410, 415, 420, 425 such as 405a, 405b and 405c), and semantics relating to the different objects 405, 410, 415, 420, 425 to their corresponding values (e.g. a "Country" object can be defined by the "Sales" object and the "Unit Sold" object), such that whenever the report file is in this context, the reporting system automatically aggregates the values accordingly.

In other words, based on a context of a report file 400, context aware help data for an operation (e.g. an operation comprising the WHERE operator) can be automatically generated and displayed to the user, since it is (nearly) always the case that an operator may be used in only a limited number of combinations. For example, in the report file 400 as shown in FIG. 4A, there are only about a half-dozen sensible contexts in which the WHERE operator may be applied, e.g. SUM ([Sales] WHERE [Country]="France").

Consequently, the following template can be automatically generated for operations comprising the WHERE operator when such operations are applied to the above specified context of the report file 400 shown in FIG. 4A:

Aggregation_Function_Type ([Measure 1] WHERE [Dimension 1]="1st Value from Dimension 1").

In the context of the report file 400, an operation comprising the WHERE operator may use one or more Aggregation_Function_Types (e.g. SUM, AVG (average), MIN, MAX, COUNT), measures or measure objects (e.g. "Sale" 108 and/or "Units Sold" 110), and/or dimensions or dimension objects (e.g. "Country" 102, "Region" 104, and/or "Product" 106).

By using the UI to generate and display to a user dynamic, context aware help data in a context of a report file 400 to a user for an operation, one or more examples of how the operation may be used in the context may be sufficient, such that the dynamic context aware help data supports or helps the user understand how the operation can be applied in the context of a report file 400. Hence, it is sufficient to provide the user with a representative sample of operations from the context, in order to enable the user to understand the operation's semantics in the context of the report file 400.

Such an approach of generating only a representative subset of examples for use with an operation for which a help functionality is requested or invoked by a user becomes even more important when providing context aware help data for large report files (e.g. comprising tables having a plurality of different objects). By generating a representative subset of examples of possible context for an operation for a large report file, a user receives an effective and efficient help data, which relieves him of the mental task of understanding an operation and its possible use and/or applicability in the context of the report file.

For example, in the report file including a table having more than ten objects, a significant number of combinations of possible contexts exists in which the WHERE operator could be used in an operation. For such a large report file, a representative subset of possible contexts (e.g. measures 1, 2 and 5, and dimensions 1, 3 and 5 combined with 3 of 5 possible aggregates) might be used which may result in six to eight examples. By selecting a representative subset of possible combinations for an operation in a context of a report file, the user is able to easily understand how to use the operation in the report file without being burdened with a large number of examples in dynamic context aware help data.

In another embodiment, it may be desirable to avoid a large number of examples in dynamic context aware help data for an operation requested in the context of the report file. Thus, upon receiving a request for help data for an operation in the context of the report file from a user through a UI, the user is requested to select and/or to specify a selected focus (e.g. one or more objects of the report file such as at least one column of a table). The selected focus is then used by the help system to generate (or drive) a more focused list (or number) of possible examples for the specified context of the report file (i.e. the selected one or more objects).

Figure 5A:
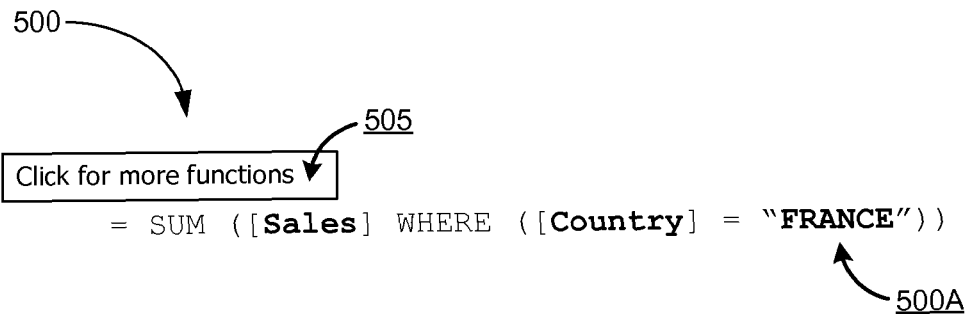
FIG. 5A to FIG. 5C illustrates exemplary contextual help data wherein changeable options may be highlighted.
Figure 5B:
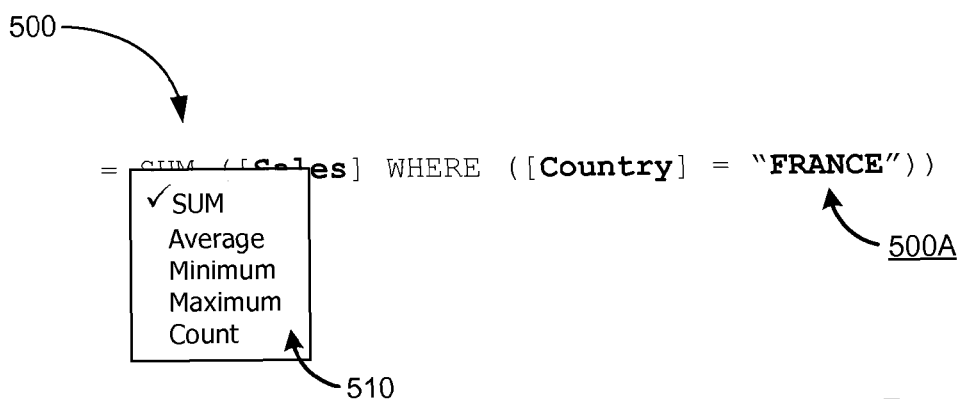
Figure 5C:
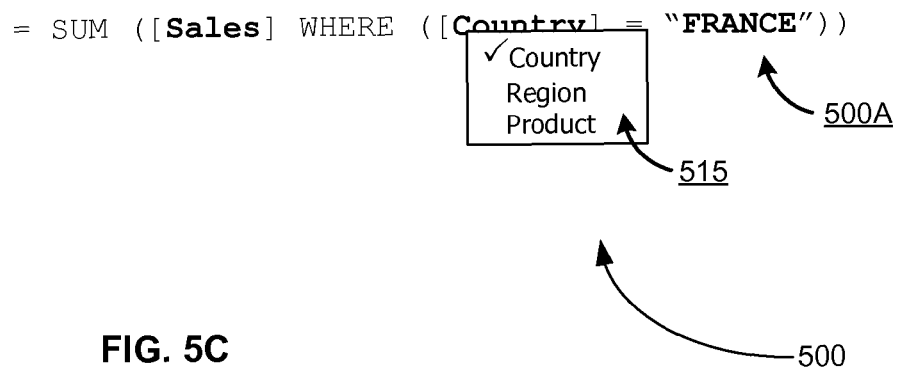

FIG. 5A to FIG. 5C illustrates exemplary contextual help data 500 wherein changeable options may be highlighted. A generated dynamic context aware help data 500 implemented in a help application (e.g. a relatively simple AJAX application) may enable a user to modify a template provided with the dynamic context aware help data 500, e.g. in terms of a drop down list or menu where each changeable option is highlighted for the operation as shown in FIG. 5A to FIG. 5C.

In one example, as shown in FIG. 5A, if the user causes a mouse pointer to hover over an exemplary aggregation function usable within the operation 500A for the report file 400, the user is provided with a tool tip 505. If the user clicks on the tool tip 505, then as shown in FIG. 5B, further aggregate functions 510 may be displayed, each of which may be valid in the proposed example operation 500A. In theory, there may be an infinite number of aggregate functions, since an aggregate function could be an addition, subtraction, multiplication, division, or statistical functions, or any other function that aggregates multiple values. Furthermore, as shown in FIG. 5C, if the user clicks on a different changeable option 515, e.g. a dimension object usable from the report file 400 in the example operation 500A, the help data reveals alternatives to other dimensions and/or variables 515 usable in the example operation 500A.

In another embodiment, the example operation or template 500A may comprise a description of the output written in natural language, e.g. the template 500A may be described as: "Returns the sum of [Sales] for France across all [Region]".

The above text describes exemplary methods and systems, which may be applied to (substantially) any other operation comprising operators usable within an underlying reporting system. For example, according to the exemplary operation 500A of FIG. 5A to FIG. 5C one could imagine also a template for the SUM aggregate function which would provide approximately 6 possible functions and/or formulas that could be written using that function.

FIG. 6 illustrates an exemplary table comprising functions and/or formulas from different categories. Table 600 includes a sample of functions and/or formulas usable within operations taken from different categories. For (substantially) all of the functions shown in the table 600, dynamic, context aware help data may be generated using mechanisms similar to those previously described with reference to FIGS. 1 to 5. The dynamic, context aware help data may comprise dynamic and/or predefined contextually-driven templates.

Figure 7:
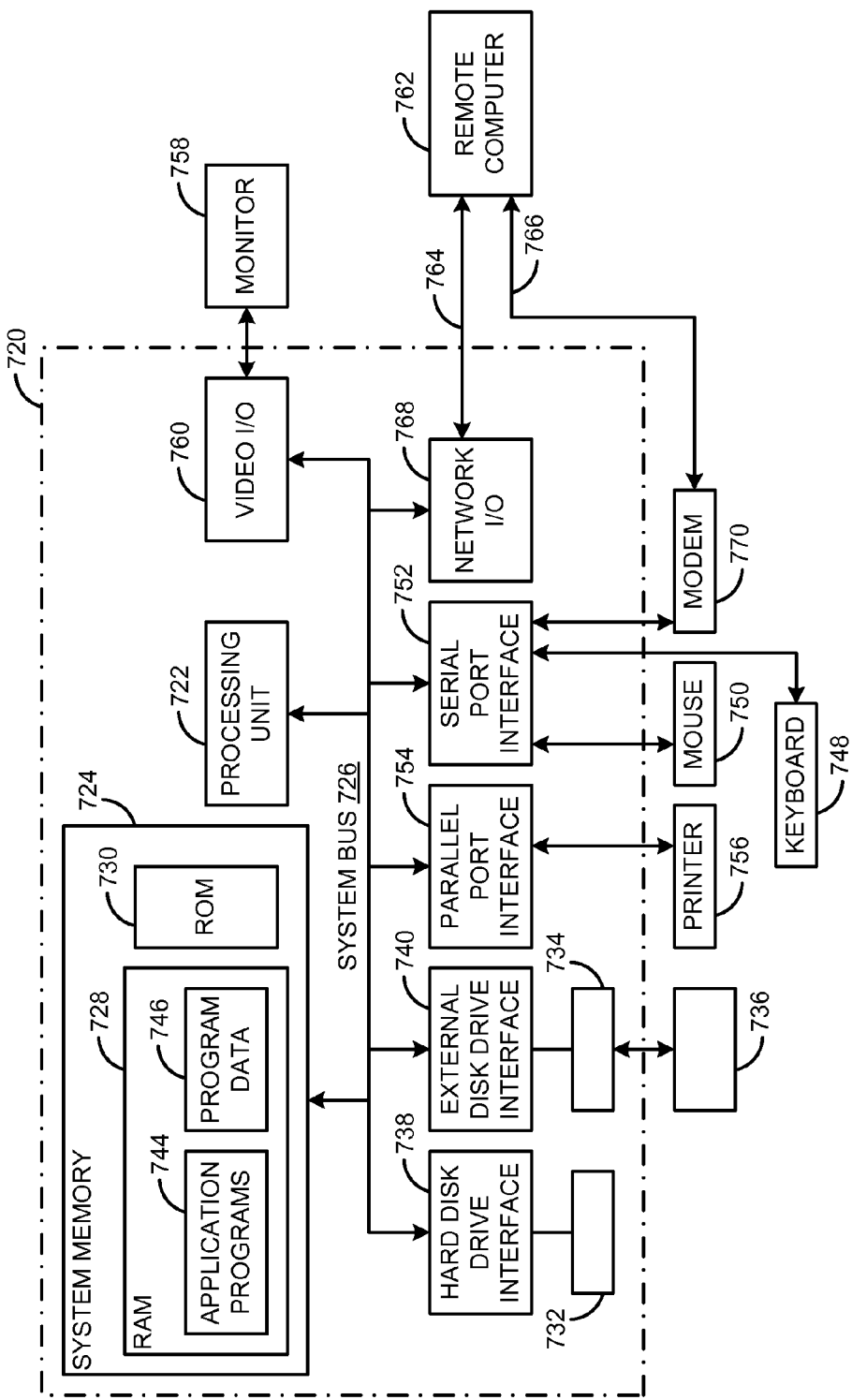
FIG. 7 illustrates an exemplary system for generating dynamic context aware help data for operations supported by at least one reporting system.

FIG. 7 illustrates an exemplary system for generating dynamic context aware help data for operations supported by at least one reporting system. A conventional computing system 720 (e.g. personal computer), includes a processing unit 722, a system memory 724, and a system bus 726, that couples various system components including the system memory 724 to the processing unit 722. The processing unit 722 may perform arithmetic, logical and/or control operations by accessing system memory 724. The system memory 724 may store information and/or instructions for use in combination with processing unit 722. The system memory 724 may include volatile and non-volatile memory, such as random access memory (RAM) 728 and read only memory (ROM) 730. A basic input/output system (BIOS) containing the basic routines that help transfer information between elements within the personal computer 720 may be stored in ROM 730. The system bus 726 may be any of several types of bus structures including a memory bus or memory controller, a peripheral bus, and a local bus using any of a variety of bus architectures.

The personal computer 720 may further include a hard disk drive 732 for reading from and writing to a hard disk (not shown), and an external disk drive 734 for reading from or writing to a removable disk 736. The removable disk 736 may be a magnetic disk for a magnetic disk driver or an optical disk such as a CD-ROM for an optical disk drive. The hard disk drive and external disk drive 734 are connected to the system bus 726 by a hard disk drive interface 738 and an external disk drive interface 740, respectively. The drives and their associated computer-readable media provide nonvolatile storage of computer readable instructions, data structures, program modules and other data for the personal computer 720. The data structures may include relevant data of the implementation of the method for generating dynamic context aware help data (e.g. help functions, help functionality) for operations supported by at least one reporting system, as described in more details above. The relevant data may be organized in a database, for example a relational or object database.

Although the exemplary environment described herein employs a hard disk (not shown) and an external disk, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk, ROM 730 or RAM 728, including an operating system (not shown), one or more application programs 744, other program modules (not shown), and program data. The application programs may include at least a part of the functionality as detailed in FIG. 1 to FIG. 6.

The user may enter commands and information, as discussed below, into the personal computer 720 through input devices such as keyboard 748 and mouse 750. Other input devices (not shown) may include a microphone (or other sensors), joystick, game pad, scanner, or the like. These and other input devices may be connected to the processing unit 722 through a serial port interface 752 that is coupled to the system bus 726, or may be collected by other interfaces, such as a parallel port interface 754, game port or a universal serial bus (USB). Further, information may be printed using printer 756. The printer 756 and other parallel input/output devices may be connected to the processing unit 722 through parallel port interface 754. A monitor 758 or other type of display device is also connected to the system bus 726 via an interface, such as a video input/output 760. In addition to the monitor 758, computing environment 720 may include other peripheral output devices (not shown), such as speakers or other audible output.

The computing environment 720 may communicate with other electronic devices such as a computer, telephone (wired or wireless), personal digital assistant, television, or the like. To communicate, the computer environment 720 may operate in a networked environment using connections to one or more electronic devices. FIG. 7 depicts the computer environment networked with remote computer 762. The remote computer 762 may be another computing environment such as a server, a router, a network PC, a peer device or other common network node, and may include many or all of the elements described above relative to the computing environment 720. The logical connections depicted in FIG. 7 include a local area network (LAN) 764 and a wide area network (WAN) 766. Such networking environments are commonplace in offices, enterprise-wide computer networks, intranets and the Internet.

When used in a LAN networking environment, the computing environment 720 may be connected to the LAN 764 through a network I/O 768. When used in a WAN networking environment, the computing environment 720 may include a modem 770 or other means for establishing communications over the WAN 766. The modem 770, which may be internal or external to computing environment 720, is connected to the system bus 726 via the serial port interface 752. In a networked environment, program modules depicted relative to the computing environment 720, or portions thereof, may be stored in a remote memory storage device resident on or accessible to remote computer 762. Furthermore other data relevant to the application of the insurance claim management evaluation method (described in more detail further below) may be resident on or accessible via the remote computer 762. The data may be stored for example in an object or a relational database. It will be appreciated that the network connections shown are exemplary and other means of establishing a communications link between the electronic devices may be used.

The above described computing system is only one example of the type of computing system that may be used to implement the method for generating dynamic context aware help data (e.g. help functions, help functionality) for operations supported by at least one reporting system.

Embodiments of the invention may include various steps as set forth above. The steps may be embodied in machine-executable program code, which causes a general-purpose or special-purpose processor to perform certain steps. Alternatively, these steps may be performed by specific hardware components that contain hardwired logic for performing the steps, or by any combination of programmed computer components and custom hardware components.

Embodiments of the present invention may also be provided as a tangible machine-readable medium for storing the machine-executable instructions. The tangible CD-ROMs, DVD-ROMs, RAMs, EPROMs, EEPROMs, magnetic or optical cards, or any other type of machine-readable media suitable for tangibly storing electronic instructions. The machine readable medium can provide the instructions stored therein to a computer system comprising a processor capable of reading and executing the instructions to implement the method steps described herein.

It should be appreciated that reference throughout this specification to one embodiment or an embodiment means that a particular feature, structure or characteristic described in connection with the embodiment is included in at least one embodiment of the present invention. These references are not necessarily all referring to the same embodiment. Furthermore, the particular features, structures or characteristics may be combined as suitable in one or more embodiments of the invention.

Throughout the foregoing description, for the purposes of explanation, numerous specific details were set forth in order to provide a thorough understanding of the invention. It will be apparent, however, to one skilled in the art that the invention may be practiced without some of these specific details. The detailed description as set forth above includes descriptions of method steps. However, one skilled in the art will understand that the order of the steps set forth above is meant for the purposes of illustration only and the claimed invention is not meant to be limited only to the specific order in which the steps are set forth. Accordingly, the scope and spirit of the invention should be judged in terms of the claims, which follow.

What is claimed is:

1. A computer-implemented method for generating a dynamic context aware help data for operations supported by at least one reporting system, the computer-implemented method comprising:

receiving, from a client computer, a help request for an operation related to analysis of data in a report file;

analyzing the report file to determine a context data of the report file;

dynamically generating help data for the operation based on a semantic relationship between one or more objects included in the report file and the operation, wherein the generated help data includes a combination of one or more operators included in the operation and the one or more objects included in the report file, the one or more operators suggested within the help data prioritized based on:

a selected focus in the report file, the one or more objects included in the report file compared to operations indexed in an indexed database of reports, and frequency and recent use of the operation in other report files of similar context; and sending the generated help data to the client computer.

2. The computer-implemented method of claim 1, wherein the help data comprises one or more examples and at least one template for the operation based on the context data.

3. The computer-implemented method of claim 2, wherein the template comprises a description of an output written in natural language.

4. The computer-implemented method of claim 1, wherein the context data of the report file comprises information on the one or more objects corresponding to a content of the report file or the semantics on the report file.

5. The computer-implemented method of claim 1, wherein dynamically generating help data comprises:

dynamically generating a first drop down list for the help data comprising the one or more objects from the report file usable within a template; and dynamically generating a second drop down list for the help data comprising the one or more operators for the operation usable within the template.

6. The computer-implemented method of claim 1, wherein dynamically generating the help data comprises:

receiving from the client computer the selected focus for the report file; and dynamically generating one or more examples according to the selected focus.

7. The computer-implemented method of claim 1, wherein dynamically generating the help data comprises:

receiving the operation and storing the operation in the context data, wherein the operation is performed before receiving the help request; and dynamically generating the help data based on the context data and the operation performed.

8. A computer system for generating a dynamic context aware help data for operations supported by at least one reporting system, the computer system comprising:

an input device operable to receive, from a client computer, a help request for an operation related to analysis of data in a report file;

a processing unit operable to analyze the report file to determine a context data of the report file;

a hard disk to store computer readable instructions, data structures and program modules, the data structures including relevant data of implementation for generating dynamic context aware help data based on a semantic relationship between one or more objects included in the report file and the operation, wherein the generated dynamic context aware help data includes a combination of one or more operators included in the operation and the one or more objects included in the report file, the one or more operators suggested within the help data prioritize based on:

a selected focus in the report file, the one or more objects included in the report file compared to operations indexed in an indexed database of reports, and frequency and recent use of the operation in other report files of similar context; and an output device operable to render the generated dynamic context aware help data to the client computer.

9. The computer system of claim 8, wherein the input device comprises a client user interface.

10. The computer system of claim 9, wherein the client user interface is configured to:

send a help request for an operation to a server computer, wherein the operation can be used to analyze the report file; and receive help data for the operation, wherein the dynamic context aware help data is dynamically generated according to the context data and the operation, the context data being generated by analyzing the report file, the dynamic context aware help data is generated by matching the context data with functions and operators used in operations other users have applied in a context same as the context data of the report file, and wherein the dynamic context aware help data includes one or more examples and at least one template for the operation based on the context data.

11. The computer system of claim 8 wherein the data structures stored in the hard disk are further configured to:

dynamically generate a first drop down list for the dynamic context aware help data including the one or more objects from the report file usable within a template; and dynamically generate a second drop down list for the dynamic context aware help data including the one or more operators for the operation that is usable within the template.

12. The computer system of claim 10 wherein the data structures stored in the hard disk are further configured to:

receive from the client computer the selected focus for the report file; and dynamically generate the one or more examples according to the selected focus.

13. The computer system of claim 8 wherein the data structures stored in the hard disk are further configured to:

receive the operation and store the operation in the context data, wherein the operation is performed before receiving the dynamic context aware help request; and dynamically generate the dynamic context aware help data based on the context data and the performed operation.

14. The computer system of claim 10, wherein the template comprises a description of an output written in natural language.

15. An article of manufacture, comprising:

a non-transitory machine readable storage medium comprising instructions which when executed by a machine cause the machine to perform operations comprising:

sending, to a server computer, a help request for an operation related to analysis of data in a report file; and receiving a help data for the operation, wherein the help data is dynamically generated according to a context data and the operation, the context data being generated by analyzing the report file, the help data is generated based on a semantic relationship between one or more objects included in the report file and the operation wherein the generated help data includes a combination of one or more operators included in the operation and the one or more objects included in the report file, the one or more operators suggested within the help data prioritized based on:
a selected focus in the report file,
the one or more objects included in the report file compared to operations indexed in an indexed database of reports, and
frequency and recent use of the operation in other report files of similar context; and
sending the generated help data to the client computer.

16. The article of manufacture in claim 15, wherein the help data comprises one or more examples and at least one template for the operation based on the context data.

17. The article of manufacture in claim 15, wherein dynamically generating help data comprises:
dynamically generating a first drop down list for the help data comprising the one or more objects from the report file usable within a template; and
dynamically generating a second drop down list for the help data comprising the one or more operators for the operation usable within the template.

18. The article of manufacture in claim 15, wherein dynamically generating the help data according to the context data comprises:
receiving from the client computer the selected focus for the report file; and
dynamically generating one or more examples according to the selected focus.

19. The article of manufacture in claim 15, wherein the context data of the report file comprises the one or more objects corresponding to a content of the report file or the semantics of the report file.

20. The computer implemented method according to claim 1, wherein the help data is generated by matching the context data with functions and operators used in the operations of other client computers in a context same as the context data of the report file.

21. The article of manufacture according to claim 15, wherein the help data is generated by matching the context data with functions and operators used in the operations of other client computers in a context same as the context data of the report file.

22. The computer implemented according to claim 1, wherein dynamically generating the help data includes:
based on data corresponding to the one or more objects in the report file, calculating, by the processor of the computer, a result value for the operation; and
inserting the calculated result value in the help data.

23. The article of manufacture according to claim 15, further comprising instructions which when executed by the computer further causes the computer to:
based on data corresponding to the one or more objects in the report file, calculate a result value for the operation; and
insert the calculated result value in the help data.

* * * * *